(12) United States Patent
Ishiyama

(10) Patent No.: US 10,657,484 B2
(45) Date of Patent: *May 19, 2020

(54) DISTRIBUTION MANAGEMENT SYSTEM, DISTRIBUTION MANAGEMENT METHOD, AND DEVICE, LABEL AND PROGRAM USED BY SAME

(75) Inventor: Rui Ishiyama, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 1113 days.

This patent is subject to a terminal disclaimer.

(21) Appl. No.: 14/002,926

(22) PCT Filed: Mar. 2, 2012

(86) PCT No.: PCT/JP2012/055442
§ 371 (c)(1),
(2), (4) Date: Sep. 3, 2013

(87) PCT Pub. No.: WO2012/121166
PCT Pub. Date: Sep. 13, 2012

(65) Prior Publication Data
US 2013/0339265 A1    Dec. 19, 2013

(30) Foreign Application Priority Data
Mar. 4, 2011    (JP) ................ 2011-047240

(51) Int. Cl.
*G06Q 10/08* (2012.01)
*G06Q 50/02* (2012.01)
(Continued)

(52) U.S. Cl.
CPC ..... *G06Q 10/0833* (2013.01); *G06K 9/00577* (2013.01); *G06Q 10/06* (2013.01);
(Continued)

(58) Field of Classification Search
CPC .................................................. G06Q 10/0833
See application file for complete search history.

(56) References Cited

U.S. PATENT DOCUMENTS

| 5,959,541 A * | 9/1999 | DiMaria | G06K 9/00 340/5.52 |
| 6,236,741 B1 * | 5/2001 | Kovacs-Vajna | A61B 5/1172 340/5.53 |

(Continued)

FOREIGN PATENT DOCUMENTS

| JP | 3355366 B2 | 10/2002 |
| JP | 2002355908 A | 12/2002 |

(Continued)

OTHER PUBLICATIONS

Yoshihiro Inagaki, "Gazo o Riyo shita Nosanbutsu no Sanchi Shomei System", Casio Disclosure Journal, Oct. 16, 2003, 6 pages, vol. 195.

(Continued)

*Primary Examiner* — Lena Najarian

(57) ABSTRACT

The present invention is a distribution management method comprising: previously storing an image characteristic of an epidermal pattern in a predetermined collation area of the agricultural, forest and fishery product to be produced or shipped by a producer or a distributor; imaging the epidermal pattern in the collation area of the agricultural, forest and fishery product, being a collation target, and acquiring the image characteristic of the epidermal pattern in the collation area; and collating the stored image characteristic of the epidermal pattern with the image characteristic of the epidermal pattern in the collation area of the agricultural, forest and fishery product, being a collation target, and determining whether or not the agricultural, forest and (Continued)

fishery product, being a collation target, is the agricultural, forest and fishery product produced or shipped by the producer or distributor.

11 Claims, 8 Drawing Sheets

(51) Int. Cl.
 *G06Q 10/06* (2012.01)
 *G06K 9/00* (2006.01)
 *G06Q 50/28* (2012.01)

(52) U.S. Cl.
 CPC ............ *G06Q 10/08* (2013.01); *G06Q 50/02* (2013.01); *G06Q 50/28* (2013.01); *G06K 2009/0059* (2013.01)

(56) References Cited

U.S. PATENT DOCUMENTS

| | | | |
|---|---|---|---|
| 7,370,799 B2* | 5/2008 | Lubow | G06K 1/121 235/462.08 |
| 2002/0081425 A1* | 6/2002 | Oh | G09F 3/0292 428/343 |
| 2004/0200892 A1 | 10/2004 | Curkendall et al. | |
| 2006/0093185 A1* | 5/2006 | Kato | G06K 9/00261 382/103 |
| 2008/0140234 A1* | 6/2008 | Shafter | G06Q 10/10 700/91 |
| 2009/0242631 A1 | 10/2009 | Wishnatzki et al. | |
| 2013/0223693 A1* | 8/2013 | Chamberlain | A01K 73/10 382/110 |

FOREIGN PATENT DOCUMENTS

| | | |
|---|---|---|
| JP | 2004-167421 A | 6/2004 |
| JP | 2005-10581 A | 1/2005 |
| JP | 2006-146570 A | 6/2006 |
| JP | 2009-295057 A | 12/2009 |
| JP | 3164301 U | 11/2010 |
| JP | 2011-90435 A | 5/2011 |
| WO | 2010/139396 A1 | 12/2010 |

OTHER PUBLICATIONS

Hitoshi Niigaki, "Recognition of 3D objects with Similar Shapes using Multi-View Images", IPSJ SIG Notes, Mar. 10, 2008, pp. 151-156, vol. 2008, No. 27.
Communication dated Jul. 24, 2014 issued by the European Patent Office in counterpart European application No. 12754255.3.
Communication dated Jun. 8, 2016, from the Japanese Patent Office in counterpart application No. 2013-503517.
Communication dated Aug. 23, 2017 from the Japanese Patent Office in counterpart application No. 2016-183904.
Communication dated Nov. 30, 2017 from the European Patent Office in counterpart application No. 12 754 255.3.
Ishiyama et al., "Melon Authentication by Agri-Biometrics: Identifying Individual Fruits using a Single Image of Rind Pattern," VISAPP 2012—International Conference on Computer Vision Theory and Applications, Jan. 2012. (8 pages total).
Notice of Reasons for Refusal dated May 15, 2019 issued by the Japanese Patent Office in counterpart application No. 2018-077721.

* cited by examiner

DISTRIBUTION MANAGEMENT SYSTEM, DISTRIBUTION MANAGEMENT METHOD, AND DEVICE, LABEL AND PROGRAM USED BY SAME

CROSS REFERENCE TO RELATED APPLICATIONS

This application is a National Stage of International Application No. PCT/JP2012/055442, filed on Mar. 2, 2012, which claims priority from Japanese Patent Application No. 2011-047240, filed on Mar. 4, 2011, the contents of all of which are incorporated herein by reference in their entirety.

TECHNICAL FIELD

The present invention relates to a distribution management system, a distribution management method, and a device, a label and a program used by the same.

BACKGROUND ART

In recent years, consciousness of pickiness etc. about safety and production districts of agricultural, forest and fishery products, and the like has been increased in customers and retailers. However, with regard to the production districts, the producers and the wholesalers that ship the agricultural, forest and fishery products to be put on shops of the retailers, the customers and retailers have no means of knowing them.

Namely, in the conventional distribution system of the agricultural, forest and fishery product, many intermediate customers (multiple wholesales etc.) stand between the producers and the customers. Due to the fact that many intermediate customers stand between the producers and the customers in such a manner, when the agricultural, forest and fishery product is delivered to the customers, it is difficult that individual product information (the production district, a producer name, a variety, a cultivation method, a harvest day, quality information, and the like of the above agricultural, forest and fishery product) of the above agricultural, forest and fishery product is precisely conveyed.

Thereupon, the individual product information acquisition system of agricultural products that enables the customer etc. to easily know individual product information of the agricultural products has been proposed (for example, Patent literature 1).

In the technology of the Patent literature 1, affixing an ID number, being an identifier, to the agricultural product such as a melon allows persons (for example, customers) other than persons involved in producing these melons (producing farmers or agricultural cooperatives) to freely acquire individual product information related to the above melon based on the above-mentioned ID number. For this, a label (seal or sticker) having the ID number described therein is affixed to the agricultural product.

Further, the technology of the Patent literature 1 causes a computer system installed in a separately-installed neutral engine (for example, a database agency) to store the individual product information related to the agriculture product together with the above-mentioned ID number, and structures a database. The producer transmits the above-mentioned ID number to this computer system, and together with it, transmits the production district, the producer name, the variety, the cultivation method, the harvest day and the quality information (a sugar content etc.) each of which is the individual product information of the above agriculture product.

At least one computer is installed in the shop of the retailer and the home of the customer, and together with it, the computer is connected to the above-mentioned computer system via a general public circuit in a manner of free communication. And the shop of the retailer and the customer transmit the ID number described in the label affixed to the agriculture product to the computer system, thereby making it possible to acquire the individual product information related to the agriculture product to be specified by the above ID number.

CITATION LIST

Patent Literature

PTL 1: Japanese Patent No. 3355366

SUMMARY OF INVENTION

Technical Problem

However, with the case of the method of identifying an individual product by affixing the label (seal or sticker) to the agricultural, forest and fishery product as is the case with the Patent literature 1, or by a packing material etc., when the label (hereinafter, what is referred to as the label includes not only the label but also the packing material) is intentionally peeled off from the agricultural, forest and fishery products, or the label is duplicated/imitated and affixed to other similar agricultural, forest and fishery products, camouflage of the shipping source of the agricultural, forest and fishery products and the like cannot be prevented.

Further, it is also thinkable to burry an IC tag or something like it into the agricultural, forest and fishery product instead of the appendix like the label; however, a commodity value declines due to damaging to the agricultural, forest and fishery product and the like. Further, there is a problem that employing the IC tag leads to a high cost as an entirety of the system.

Thereupon, the present invention has been accomplished in consideration of the above-mentioned problems, and an object of the present invention is to provide a distribution management system and a distribution management method that make it possible to perform the distribution management of the agricultural, forest and fishery product without necessitating a special device such as the IC tag, and a device, a label and a program used by them.

Solution to Problem

The present invention is a distribution management system of an agricultural, forest and fishery product, comprising: a first imaging means that images an epidermal pattern in a predetermined collation area of the agricultural, forest and fishery product to be produced or shipped by a producer or a distributor; a first image characteristic extracting means that extracts an image characteristic of the epidermal pattern in said collation area from the image imaged by said first imaging means; a storing means in which said extracted image characteristics of the epidermal patterns in the collation area of the agricultural, forest and fishery product are stored; a second imaging means that images an epidermal pattern in the collation area of the agricultural, forest and fishery product, being a collation target; a second image characteristic extracting means that extracts the image characteristic of the epidermal pattern in said collation area from the image imaged by said second imaging means, and a determining means that collates said stored image characteristic of the epidermal pattern with the image characteristic of the epidermal pattern in the collation area of said agricultural, forest and fishery product, being a collation target, and determines whether or not said agricultural, forest and fishery product, being a collation target, is the agricultural, forest and fishery product produced or shipped by said producer or distributor.

The present invention is a collation server for collating an agricultural, forest and fishery product produced or shipped by a producer or distributor with the agricultural, forest and fishery product, being a collation target, comprising: a storing means in which the image characteristics of the epidermal patterns in a predetermined collation area of the agricultural, forest and fishery product are stored; an image characteristic extracting means that receives an image of the epidermal pattern in the collation area of the agricultural, forest and fishery product, being a collation target, and extracts the image characteristic of the epidermal pattern in said collation area from the received image; and a determining means that collates said stored image characteristic of the epidermal pattern with the image characteristic of the epidermal pattern in the collation area of said agricultural, forest and fishery product, being a collation target, and determines whether or not said agricultural, forest and fishery product, being a collation target, is the agricultural, forest and fishery product produced or shipped by said producer or distributor.

The present invention is an image characteristic extraction device comprising an image characteristic extracting means that extracts an image characteristic of an epidermal pattern in a predetermined collation area of an agricultural, forest and fishery product.

The present invention is a collation terminal device for collating an agricultural, forest and fishery product produced or shipped by a producer or distributor with the agricultural, forest and fishery product, being a collation target, comprising: a storing means in which the image characteristics of the epidermal patterns in a predetermined collation area of the agricultural, forest and fishery product are stored; an image characteristic extracting means that, from an image of the epidermal pattern in the collation area of the agricultural, forest and fishery product, being a collation target, that has been imaged, extracts the image characteristic of the epidermal pattern in said collation area; a determining means that collates said stored image characteristic of the epidermal pattern with the image characteristic of the epidermal pattern in the collation area of said agricultural, forest and fishery product, being a collation target, and determines whether or not said agricultural, forest and fishery product, being a collation target, is the agricultural, forest and fishery product produced or shipped by said producer or distributor; and a displaying means that displays said determination result.

The present invention is a label to be affixed to an agricultural, forest and fishery product, said label becoming a reference to fix a collation area for determining genuineness or spuriousness of the agricultural, forest and fishery product.

The present invention is a distribution management method of an agricultural, forest and fishery product, comprising: previously storing an image characteristic of an epidermal pattern in a predetermined collation area of the agricultural, forest and fishery product to be shipped by a producer or a distributor; imaging the epidermal pattern in said collation area of the agricultural, forest and fishery product, being a collation target, and acquiring the image characteristic of the epidermal pattern in said collation area; and collating said stored image characteristic of the epidermal pattern with the image characteristic of the epidermal pattern in the collation area of said agricultural, forest and fishery product, being a collation target, and determining whether or not said agricultural, forest and fishery product, being a collation target, is the agricultural, forest and fishery product shipped by said producer or distributor.

The present invention is a program for determining genuineness or spuriousness of an agricultural, forest and fishery product to be produced or shipped by a producer or distributor, said program causing an information processing device to execute: a process of, from an image of an epidermal pattern in a predetermined collation area of the agricultural, forest and fishery product, being a collation target, acquiring an image characteristic of the epidermal pattern in said collation area; and a process of collating the image characteristic of the epidermal pattern of said agricultural, forest and fishery product, being a collation target, with the previously stored image characteristic of the epidermal pattern in said collation area of the agricultural, forest and fishery product to be shipped from the producer or the distributor, and determining whether or not said agricultural, forest and fishery product, being a collation target, is the agricultural, forest and fishery product shipped by said producer or distributor.

Advantageous Effect of Invention

The present invention can perform the distribution management of the agricultural, forest and fishery product without necessitating a special device such as the IC tag.

DESCRIPTION OF EMBODIMENTS

The exemplary embodiment of the present invention will be explained.

Figure 1:
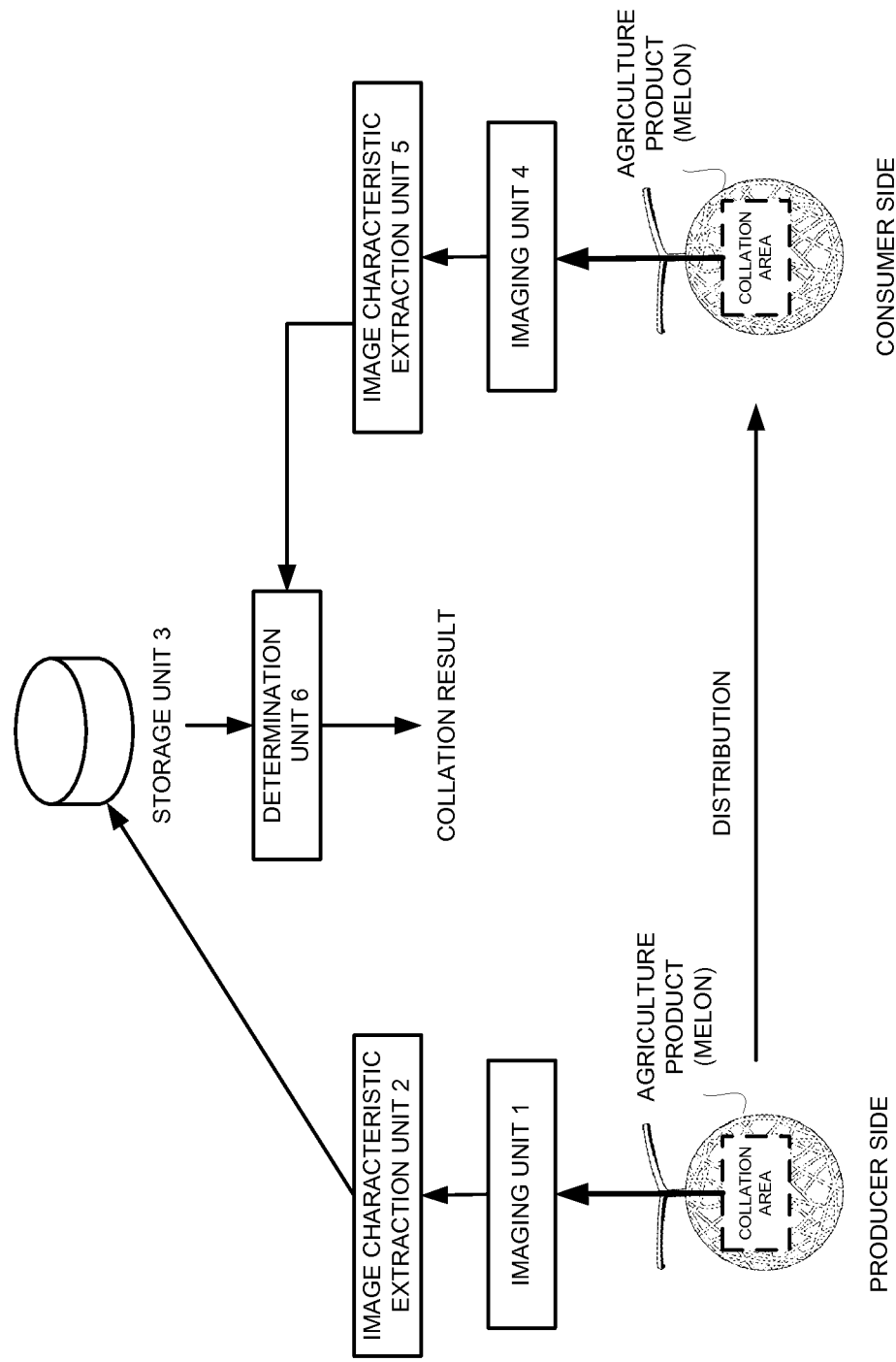
FIG. 1 is a block diagram illustrating an exemplary embodiment of the present invention.

FIG. 1 is a block diagram illustrating the exemplary embodiment of the present invention.

The exemplary embodiment of the present invention is a distribution management system of an agricultural, forest and fishery product including a first imaging unit 1 that images an image of an epidermal pattern in a predetermined collation area of the agricultural, forest and fishery product to be produced or shipped by a producer or a distributor, a first image characteristic extraction unit 2 that extracts an image characteristic of the epidermal pattern in the aforementioned collation area from the image imaged by the first imaging unit 1, a storage unit 3 in which the extracted image characteristics of the epidermal patterns in the collation area of the agricultural, forest and fishery product are stored, a second imaging unit 4 that images the epidermal pattern in the collation area of the agricultural, forest and fishery product, being a collation target, a second image characteristic extraction unit 5 that extracts the image characteristic of the epidermal pattern in the aforementioned collation area from the image imaged by the second imaging unit 4, and a determination unit 6 that collates the stored image characteristic of the epidermal pattern with the image characteristic in the collation area of the epidermal pattern of the agricultural, forest and fishery product, being a collation target, and determines whether or not the aforementioned agricultural, forest and fishery product, being a collation target, is the agricultural, forest and fishery product produced or shipped by the aforementioned producer or distributor.

The present invention utilizes the fact that the epidermal pattern of the agricultural, forest and fishery product differs for each individual product, and performs the collation of the above agricultural, forest and fishery product. Thus, the agricultural, forest and fishery product for which the present invention is applied is not particularly limited so far as the epidermal pattern of the agricultural, forest and fishery product is distinctive, and as the agricultural, forest and fishery product of which the epidermal pattern is distinctive, there exist, for example, a melon, a strawberry, an apple, a lemon, a pear, a mandarin, a flesh flower, fishery products, wood, and the like. Further, as the epidermal pattern of the agricultural, forest and fishery product, for example, a surface pattern of the melon, a grain of a seed of the surface of the strawberry, a leaf vein of the flesh flower, a scale of the fish, a grain and annual ring of the wood, and the like. Additionally, in the following, the melon is exemplified as the agricultural, forest and fishery product for explanation.

Further, the so-called producer or distributor is a concept including persons who are engaged in the production (producing farmers or agricultural cooperatives), persons who perform the quality management of the agricultural, forest and fishery product in the distribution stage, and the like.

Further, the so-called collation area is an area of one part of the epidermal of the agricultural, forest and fishery product that is used for performing the collation of the agricultural, forest and fishery product. A position of the collation area does not matter; however, it is preferable to define an area adjacent to a thing that becomes a reference for a position and a direction of the image, as the collation area, in consideration of a load etc. of a collation process to be later described.

Figure 2:
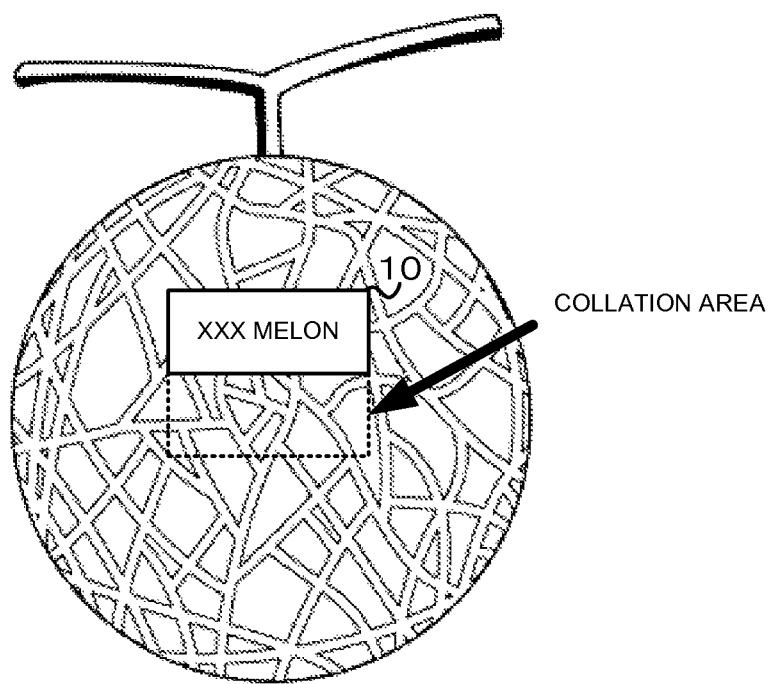
FIG. 2 is a view for explaining a collation area.
Figure 3:
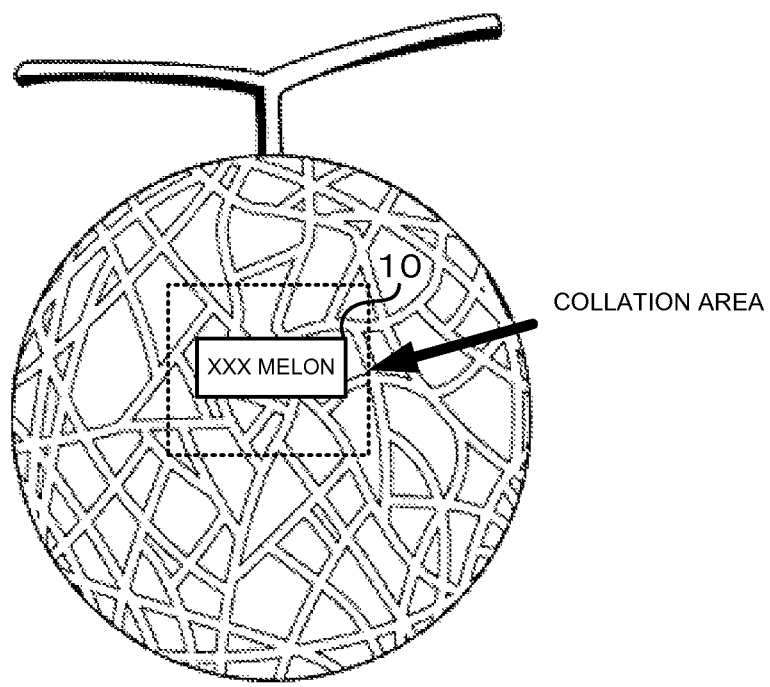
FIG. 3 is a view for explaining the collation area.

As an example of a setting the position of the collation area, there exists the method of setting the collation area with the label (for example, the label having a local organization brand described therein, the label indicative of the producer, and the like) to be affixed to the agricultural, forest and fishery product taken as a reference. For example, as shown in FIG. 2, with a label 10 affixed to the melon taken as a reference, the collation area of which the size is equal to that of the label 10 is set in a position below it. Setting the collation area in such a manner makes it possible to surely identify the position (upper, lower, left, and right) of the collation area by taking the label 10 as a reference because the same type of the label is normally used as the label 10. Additionally, the above-mentioned example is one example, and the method of setting the collation area is not limited hereto. For example, a scope that is a multiple in length and breadth of the size of the brand label 10 can be defined as the collation area in some cases, and the setting can be made in such a manner that the setting position of the collation area is a center of the label 10 as shown in FIG. 3 in some cases. Besides, in addition to directly affixing the label to the agricultural, forest and fishery product, in a situation in which the agricultural, forest and fishery product is packed with a transparent package, the label affixed to the above package may be taken as a reference.

Figure 4:
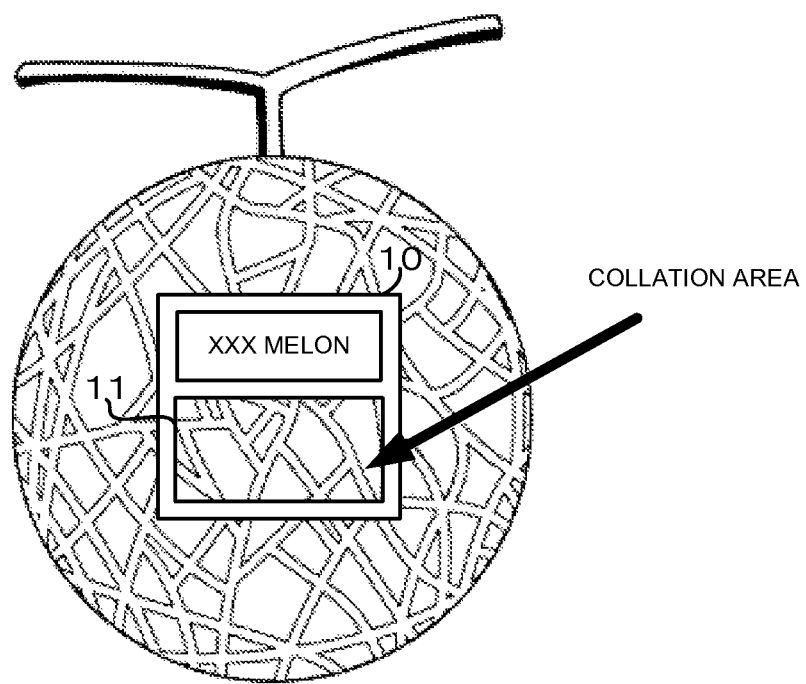
FIG. 4 is a view for explaining a label to be used for determining genuineness or spuriousness.

Further, as another method of setting the collation area, as shown in FIG. 4, it is also possible to mount a transparent portion 11 through which the epidermal pattern can be seen onto the label, and define a scope of the above transparent portion 11 as the collation area. Additionally, the transparent portion 11 may be positioned in the upper side or the lower side of the area in which characters etc. are described. Further, instead of the transparent portion 11, the opening portion may be used. In addition, with regard to the strawberry etc., the strawberry etc. may be crammed in a pack with a window that is partially transparent or partially opened, to set the portion of the window that is transparent or opened as the collation area.

Figure 5:
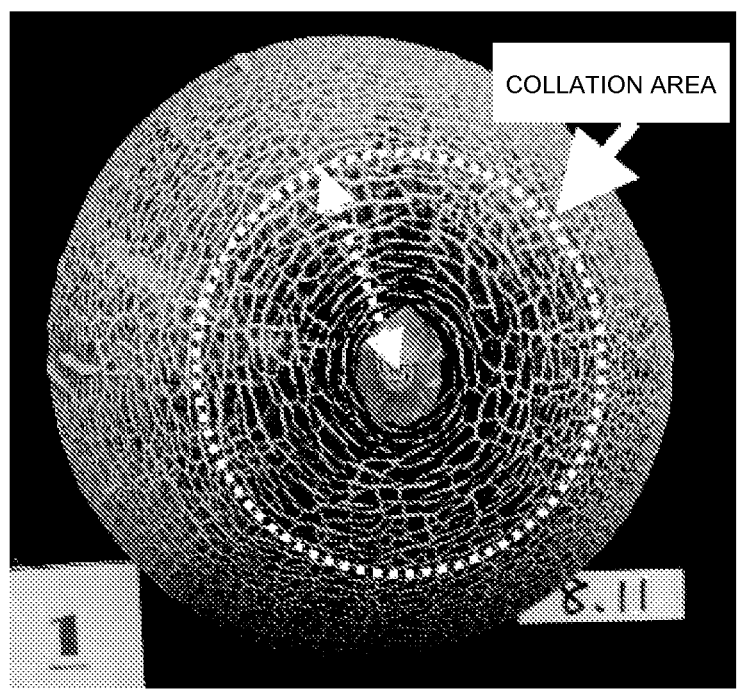
FIG. 5 is a view for explaining the collation area.

The above-described position of the collation area has been set with the label etc. taken as a reference; however, a thing that becomes a reference may be set for the agricultural, forest and fishery product itself to define a predetermined scope with this taken as a reference as the collation area. For example, "operculum", "navel", "plant stem" and the like of the agricultural, forest and fishery product are listed. An example of setting the collation area with the operculum taken as a reference is shown in FIG. 5.

Next, a configuration of each unit will be explained.

The imaging unit 1, which exists in the side of persons who are engaged in the production (producing farmers or agricultural cooperatives), and persons who perform the quality management of the agricultural, forest and fishery product in the distribution stage, performs the imaging of the collation area of the agricultural, forest and fishery product that is performed by the producer etc. A special device for imaging the collation area of the agricultural, forest and fishery product may be installed onto the imaging unit 1; however, a digital camera, a mobile telephone and the like provided with CCD, CMOS and the like may be used. Further, any file format of the imaged image may be used, and JPEG and the like may be used.

The image characteristic extraction unit 2 extracts the image characteristic of the epidermal pattern in the collation area from the image imaged by the imaging unit 1. For the extraction of the image characteristics, the extraction technology of a fingerprint such as a luminance value of the image, a characteristic point thereof, an inflection point of a line of binary images, an intersection point thereof, an endpoint thereof, and a center point thereof can be used. The image characteristics extracted in such a manner are stored in the storage unit 3. Additionally, hereinafter, the agricultural, forest and fishery product recorded (registered) in the storage unit 3 is described as a registered agricultural, forest and fishery product.

In addition, the image characteristic of the registered agricultural, forest and fishery product may be stored correspondingly to production information such as the production district, the producer name, the variety, the cultivation method, the harvest day, the quality information (the sugar content etc.) and readiness to eat of the above agricultural, forest and fishery product, distribution information such as the shipping location and the shipping date, and the like. Doing so makes it possible to acquire history information of the agricultural, forest and fishery product for which the collation has been performed.

The imaging unit 4 and the image characteristic extraction unit 5, which exist in the side performing the collation of the agricultural, forest and fishery product such as the consumer, have a configuration similar to those of the imaging unit 1 and the image characteristic extraction unit 2, respectively.

The determination unit 6 collates the image characteristic of the epidermal pattern in the collation area of the agricultural, forest and fishery product, being a collation target, extracted by the image characteristic extraction unit 5 with the image characteristic of the epidermal pattern in the collation area stored in the storage unit 3, and determines that the agricultural, forest and fishery product, being a collation target, is the agricultural, forest and fishery product produced or shipped by the aforementioned producer or distributor when there exists the image characteristic that coincides with the stored image characteristic. Herein, with regard to the collation method of the image characteristic, for example, the endpoint, the intersection point and an angle of a line of the epidermal pattern are defined as a characteristic point (with the case of the epidermal pattern of the strawberry, the center of a spot of the epidermal is defined as a characteristic point), the collation is performed for an arrangement of the characteristic points, and the image characteristic is determined to be identical when the number of sets of the characteristic points existing in an identical position (a range within a certain threshold) is equal to more than to a constant number. The existing technology of the fingerprint collation can be used for such a collation technology.

As mentioned above, this exemplary embodiment makes it possible to determine genuineness or spuriousness of the agricultural, forest and fishery product without necessitating a special tag, to perform the distribution management of the agricultural, forest and fishery product that is formally shipped from the producer and the wholesaler of the agricultural, forest and fishery product, and to prevent the camouflage such as replacement.

Further, storing the image of the epidermal pattern of the agricultural, forest and fishery product correspondingly to production information such as the production district, the producer name, the variety, the cultivation method, the harvest day, the quality information (the sugar content etc.) and readiness to eat of the above agricultural, forest and fishery product, distribution information such as the shipping location and the shipping date, and the like enables the consumer side to know the history information as well of the above agricultural, forest and fishery product.

Hereinafter, a specific example of the distribution management system in the above-described exemplary embodiment will be described. Additionally, in the following, the melon is exemplified as the agricultural, forest and fishery product for explanation.

Figure 6:
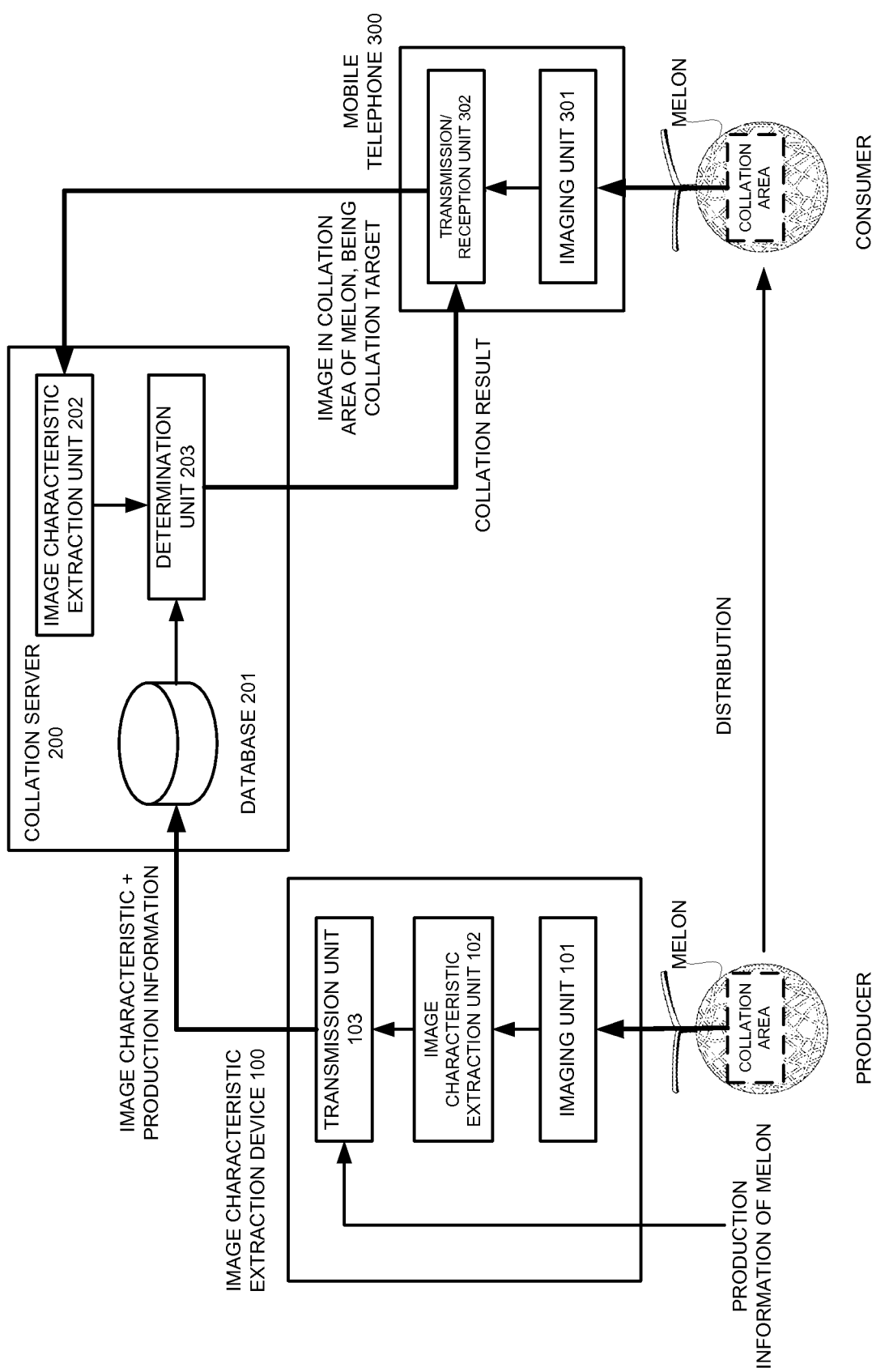
FIG. 6 is a block diagram of an example of the distribution management system.

FIG. 6 is a block diagram of an example of the distribution management system.

As shown in FIG. 6, the distribution management system is provided with an image characteristic extraction device 100 to be installed in the producer side of the melon, a collation server 200 that performs the collation, and a mobile telephone 300 of the consumer.

The image characteristic extraction device 100 includes an imaging unit 101, an image characteristic extraction unit 102, and a transmission unit 103. Additionally, the imaging unit 101 and the image characteristic extraction unit 102 have a configuration similar to those of the above-described the imaging unit 1 and the image characteristic extraction unit 2, respectively. The transmission unit 103 transmits the image characteristic in the collation area of the melon extracted by the image characteristic extraction unit 102, and the production information (the production district, the producer name, the variety, the cultivation method, the harvest day, the quality information, and the like) of the above melon.

The collation server 200 includes a database 201, an image characteristic extraction unit 202, and a determination unit 203. The image characteristic extraction unit 202 and the determination unit 203 have a configuration similar to those of the above-described image characteristic extraction unit 5 and the determination unit 6, respectively. The image characteristic of the epidermal pattern of each melon transmitted from the image characteristic extraction device 100 of the producer side and the production information of the above melon are stored correspondingly to each other in the database 201.

The mobile telephone 300 includes an imaging unit 301 and a transmission/reception unit 302. The imaging unit 301 has a configuration similar to that of the above-described imaging unit 4. The transmission/reception unit 302 transmits the image of the epidermal pattern in the collation area of the melon imaged by the imaging unit 301 to the collation server 200. Further, the transmission/reception unit 302 receives a determination result coming from the collation server 200.

Next, an operation of the above-mentioned configuration will be explained.

At first, an operation of registering the image characteristic of the epidermal pattern of the melon will be explained.

Figure 7:
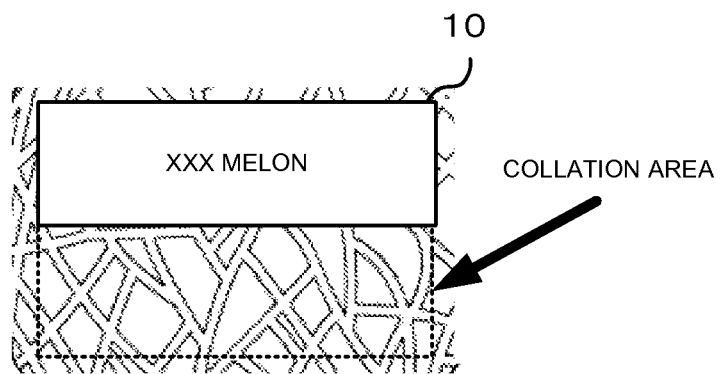
FIG. 7 is a view illustrating one example of an image of an epidermal pattern in the collation area.

The producer affixes the label 10 as shown in FIG. 2 to the melon, and together with it, photographs the epidermal pattern of the melon including the collation area with the label 10 taken as a reference by the imaging unit 101. At this point, the producer photographs the epidermal pattern so as to avoid that the label 10 is upside down. FIG. 7 shows the image of the epidermal pattern of the melon photographed by use of the imaging unit 101.

Figure 8:
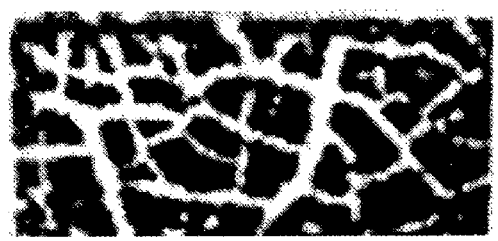
FIG. 8 is a view illustrating one example of an image characteristic of the epidermal pattern in the collation area.

The image characteristic extraction unit 102 extracts the image characteristic in the collation area from the image of the epidermal pattern of the imaged melon. Herein, with regard to the image characteristic, the collation area is determined with the label 10 taken as a reference, and the image characteristic of the epidermal pattern in the collation area is extracted. One example of the extracted image characteristic is shown in FIG. 8. FIG. 8 show the image characteristic obtained by binarizing the epidermal pattern in the collation area with a predetermine threshold taken as a reference.

Further, the producer inputs the production information (the production district, the producer name, the variety, the cultivation method, the harvest day, the quality information, and the like) of the photographed melon into the image characteristic extraction device 100. And, the transmission unit 103 transmits the image characteristic of the melon and the production information of the above melon to the collation server 200.

The collation server 200 registers the image characteristic of the melon and the production information of the above melon coming from the image characteristic extraction device 100 of the producer onto the database 201.

Continuously, an operation of the collation process will be explained.

So as to perform the collation of the melon, being a collation target, the consumer images the epidermal pattern of the melon including the collation area with the label 10 taken as a reference by use of the imaging unit 301 of the mobile telephone 300. The imaged image is transmitted to the collation server 200 by the transmission/reception unit 302.

The image characteristic extraction unit 202 of the collation server 200 extracts the image characteristic of the epidermal pattern in the collation area from the transmitted image with a method similar to the above-described method. And, the image characteristic extraction unit 202 outputs the extracted image characteristic to the determination unit 203.

The determination unit 203 collates the received image characteristic with the image characteristic registered onto the database 201, reads out the production information caused to correspond to the above image characteristic when there exists the image characteristic that coincides with the registered image characteristic, and transmits it to the mobile telephone 300. On the other hand, the determination unit 203 notifies the effect that the melon, being a target of genuineness or spuriousness, has been camouflaged when there exists no image characteristic that coincide with the registered image characteristic as a result of the collation.

The mobile telephone 300 receives a result of the determination of genuineness or spuriousness from the collation server 200, and notifies it to the consumer.

In such a manner, in this example, the consumer can perform the collation of the agricultural, forest and fishery product without having a special machine member and can acquire the production information as well of the above agricultural, forest and fishery product as a result of the collation.

Additionally, in the above-described example, the image characteristic extraction unit 102 for extracting the image characteristic of the agricultural, forest and fishery product was configured to be installed into the device of the producer side; however, the image characteristic extraction unit 202 of the collation server 200 may be used as the image characteristic extraction unit 102 as well. In this case, a configuration is made so that the producer side transmits the image in the collation area of the agricultural, forest and fishery product.

Figure 9:
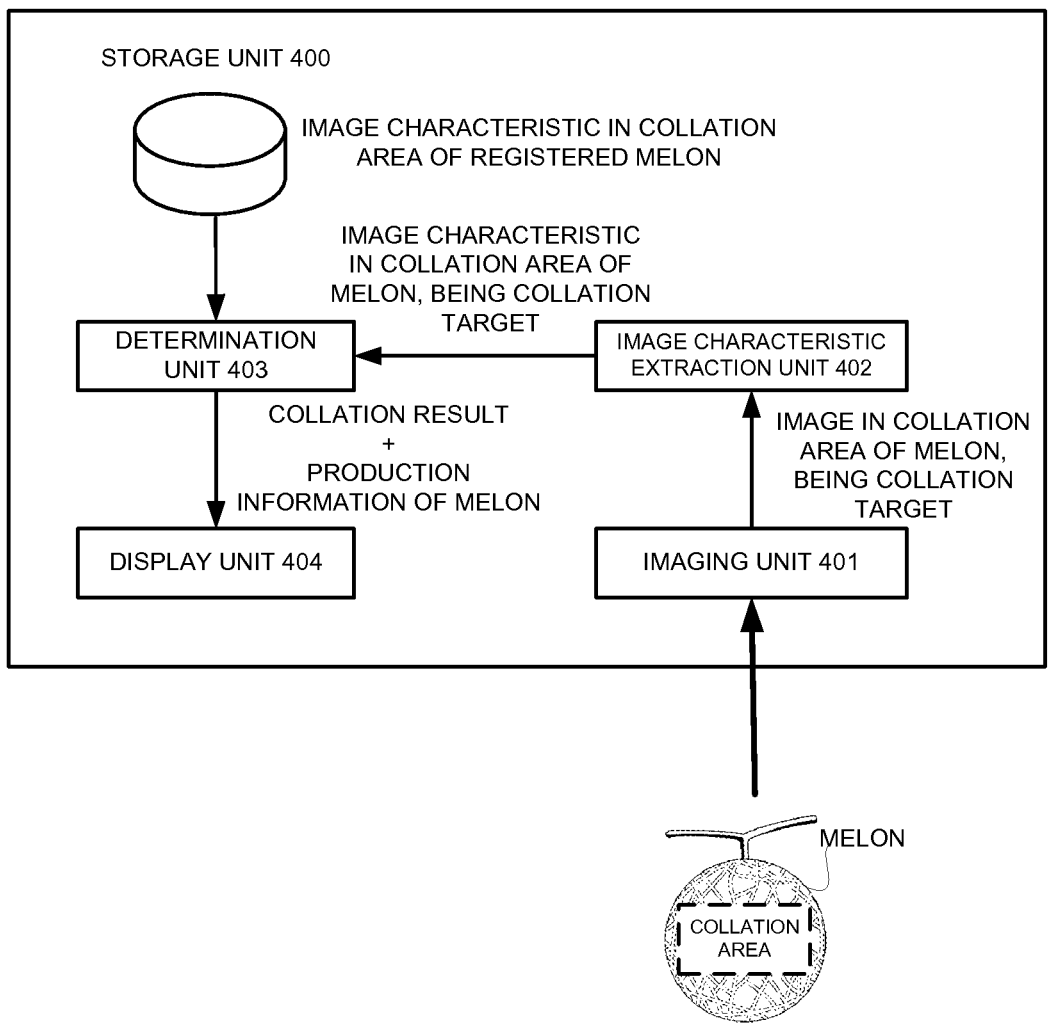
FIG. 9 is a block diagram of a collation terminal device.

Further, in the above-described example, the collation server 200 was installed, and each consumer side performed the collation process via the communication; however, the image of the epidermal pattern of the agricultural, forest and fishery product may be previously downloaded from the database having the images of the epidermal patterns of the agricultural, forest and fishery product registered therein as is the case with the database 201 to perform the collation process without going through the communication. Such a collation terminal device, as shown in FIG. 9, is provided with a storage unit 400 that stores the image characteristics of the epidermal patterns of the registered agricultural, forest and fishery product to be registered by the producer etc., an imaging unit 401, an image characteristic extraction unit 402, a determination unit 403, and a display unit 404. The imaging unit 401, the image characteristic extraction unit 402, and the determination unit 403 have a configuration similar to those of the above-described imaging unit, image characteristic extraction unit, and determination unit, respectively, and the display unit 404 displays the determination result by the determination unit 404, the production information of the above registered agricultural, forest and fishery product in a case in which the image characteristic has been determined to be identical, and the like.

Further, as apparent from the above-described explanation, it is also possible to configure the image characteristic extraction unit and the determination unit with hardware; however, it is also possible to configure them with a computer program. In this case, functions and operations similar to the functions and the operations of the above-described exemplary embodiment and example are realized by a processor that operates under a program stored in a program memory.

One part or an entirety of the above exemplary embodiment can be expressed as the following Supplementary note, but the invention is not limited thereto.

(Supplementary note 1) A distribution management system of an agricultural, forest and fishery product, comprising:

a first imaging means that images an epidermal pattern in a predetermined collation area of the agricultural, forest and fishery product to be produced or shipped by a producer or a distributor;

a first image characteristic extracting means that extracts an image characteristic of the epidermal pattern in said collation area from the image imaged by said first imaging means;

a storing means in which said extracted image characteristics of the epidermal patterns in the collation area of the agricultural, forest and fishery product are stored;

a second imaging means that images an epidermal pattern in the collation area of the agricultural, forest and fishery product, being a collation target;

a second image characteristic extracting means that extracts the image characteristic of the epidermal pattern in said collation area from the image imaged by said second imaging means, and a determining means that collates said stored image characteristic of the epidermal pattern with the image characteristic of the epidermal pattern in the collation area of said agricultural, forest and fishery product, being a collation target, and determines whether or not said agricultural, forest and fishery product, being a collation target, is the agricultural, forest and fishery product produced or shipped by said producer or distributor.

(Supplementary note 2) The distribution management system of the agricultural, forest and fishery product according to Supplementary note 1, wherein said collation area is a predetermined scope with a label to be affixed to the agricultural, forest and fishery product by the producer or distributor taken a reference.

(Supplementary note 3) The distribution management system of the agricultural, forest and fishery product according to Supplementary note 2, wherein identification information that enables a position of said collation area to be identified is added to said label.

(Supplementary note 4) The distribution management system of the agricultural, forest and fishery product according to Supplementary note 2 or Supplementary note 3, wherein said label includes a transparent portion in which said collation area is transparent, or an opening portion in which said collation area is opened.

(Supplementary note 5) The distribution management system of the agricultural, forest and fishery product according to one of Supplementary note 1 to Supplementary note 4, wherein said agricultural, forest and fishery product is at least one of a melon, a strawberry, an apple, a lemon, a pear, a mandarin, a flesh flower, fishery products, and wood.

(Supplementary note 6) A collation server for collating an agricultural, forest and fishery product produced or shipped by a producer or distributor with the agricultural, forest and fishery product, being a collation target, comprising:

a storing means in which the image characteristics of the epidermal patterns in a predetermined collation area of the agricultural, forest and fishery product are stored;

an image characteristic extracting means that receives an image of the epidermal pattern in the collation area of the agricultural, forest and fishery product, being a collation target, and extracts the image characteristic of the epidermal pattern in said collation area from the received image; and a determining means that collates said stored image characteristic of the epidermal pattern with the image characteristic of the epidermal pattern in the collation area of said agricultural, forest and fishery product, being a collation target, and determines whether or not said agricultural, forest and fishery product, being a collation target, is the agricultural, forest and fishery product produced or shipped by said producer or distributor.

(Supplementary note 7) An image characteristic extraction device comprising an image characteristic extracting means that extracts an image characteristic of an epidermal pattern in a predetermined collation area of an agricultural, forest and fishery product.

(Supplementary note 8) The image characteristic extraction device according to Supplementary note 7, comprising a transmitting means that transmits the image characteristic of the epidermal pattern in said collation area to a collation server.

(Supplementary note 9) A collation terminal device for collating an agricultural, forest and fishery product produced or shipped by a producer or distributor with the agricultural, forest and fishery product, being a collation target, comprising:

a storing means in which the image characteristics of the epidermal patterns in a predetermined collation area of the agricultural, forest and fishery product are stored;

an image characteristic extracting means that, from an image of the epidermal pattern in the collation area of the agricultural, forest and fishery product, being a collation target, that has been imaged, extracts the image characteristic of the epidermal pattern in said collation area;

a determining means that collates said stored image characteristic of the epidermal pattern with the image characteristic of the epidermal pattern in the collation area of said agricultural, forest and fishery product, being a collation target, and determines whether or not said agricultural, forest and fishery product, being a collation target, is the agricultural, forest and fishery product produced or shipped by said producer or distributor; and a displaying means that displays said determination result.

(Supplementary note 10) A label to be affixed to an agricultural, forest and fishery product, said label becoming a reference to fix a collation area for determining genuineness or spuriousness of the agricultural, forest and fishery product.

(Supplementary note 11) The label of the agricultural, forest and fishery product according to Supplementary note 10, said label including a transparent portion in which said collation area is transparent, or an opening portion in which said collation area is opened.

(Supplementary note 12) A distribution management method of an agricultural, forest and fishery product, comprising:

previously storing an image characteristic of an epidermal pattern in a predetermined collation area of the agricultural, forest and fishery product to be shipped by a producer or a distributor;

imaging the epidermal pattern in said collation area of the agricultural, forest and fishery product, being a collation target, and acquiring the image characteristic of the epidermal pattern in said collation area; and collating said stored image characteristic of the epidermal pattern with the image characteristic of the epidermal pattern in the collation area of said agricultural, forest and fishery product, being a collation target, and determining whether or not said agricultural, forest and fishery product, being a collation target, is the agricultural, forest and fishery product shipped by said producer or distributor.

(Supplementary note 13) The distribution management method of the agricultural, forest and fishery product according to Supplementary note 12, wherein said collation area is a predetermined scope with a label to be affixed to the agricultural, forest and fishery product by the producer or distributor taken as a reference.

(Supplementary note 14) The distribution management method of the agricultural, forest and fishery product according to Supplementary note 13, wherein identification information that enables a position of said collation area to be identified is added to said label.

(Supplementary note 15) The distribution management method of the agricultural, forest and fishery product according to Supplementary note 13 or Supplementary note 14, wherein said label is transparent or opened in said collation area.

(Supplementary note 16) The distribution management method of the agricultural, forest and fishery product according to one of Supplementary note 12 to Supplementary note 15, wherein said agricultural, forest and fishery product is at least one of a melon, a strawberry, an apple, a lemon, a pear, a mandarin, a flesh flower, fishery products, and wood.

(Supplementary note 17) A program for determining genuineness or spuriousness of an agricultural, forest and fishery product to be produced or shipped by a producer or distributor, said program causing an information processing device to execute:

a process of, from an image of an epidermal pattern in a predetermined collation area of the agricultural, forest and fishery product, being a collation target, acquiring an image characteristic of the epidermal pattern in said collation area; and a process of collating the image characteristic of the epidermal pattern of said agricultural, forest and fishery product, being a collation target, with the previously stored image characteristic of the epidermal pattern in said collation area of the agricultural, forest and fishery product to be shipped from the producer or the distributor, and determining whether or not said agricultural, forest and fishery product, being a collation target, is the agricultural, forest and fishery product shipped by said producer or distributor.

Above, although the present invention has been particularly described with reference to the preferred embodiments and the examples, it should be readily apparent to those of ordinary skill in the art that the present invention is not always limited to the above-mentioned embodiments and examples, and changes and modifications in the form and details may be made without departing from the spirit and scope of the invention.

REFERENCE SIGNS LIST 1 first imaging unit
2 first image characteristic extraction unit
3 storage unit
4 second imaging unit
5 second image characteristic extraction unit
6 determination unit

The invention claimed is:

1. A collation server for collating an agricultural, forest and fishery product produced or shipped by a producer or distributor with the agricultural, forest and fishery product, being a collation target, comprising:
a storage in which image characteristics of epidermal patterns in a predetermined collation area of the agricultural, forest and fishery product are stored, wherein the collation area is an area of which a location and a direction are set relative to a reference of the agricultural, forest and fishery product;
at least one memory storing instructions, and
at least one processor configured to execute the instructions to:
receive an image of an epidermal pattern in the collation area of the agricultural, forest and fishery product, being a collation target, determine the collation area relative to the reference in the received image, extract an image characteristic of the epidermal pattern in said collation area from the received image, the image characteristic including at least one of a luminance value and characteristic points, the characteristic points including an endpoint, an intersection point, and an angle of a line of the epidermal pattern in the collation area of said agricultural, forest and fishery product, being a collation target,
collate said image characteristic of the epidermal pattern stored in the storage with the image characteristic of the epidermal pattern in the collation area of said agricultural, forest and fishery product, being a collation target, and determine, by comparing the at least one of the luminance value and the characteristic points of the image characteristic in the received image with at least one of a luminance value and characteristic points of the image characteristic of the epidermal pattern stored in the storage, whether or not said agricultural, forest and fishery product, being a collation target, is the agricultural, forest and fishery product produced or shipped by said producer or distributor.

2. An image characteristic extraction device comprising:
at least one memory storing instructions, and
at least one processor configured to execute the instructions to
determine a predetermined collation area in an image of an agricultural, forest and fishery product using a label affixed to an agricultural, forest and fishery product as a reference and extract an image characteristic including an epidermal pattern in the predetermined collation area of the agricultural, forest and fishery product, the image characteristic including at least one of a luminance value and characteristic points, the characteristic points including an endpoint, an intersection point, and an angle of a line of the epidermal pattern in the collation area of said agricultural, forest and fishery product, being a collation target,
wherein the collation area is an area of which a location and a direction are set relative to the label of the agricultural, forest and fishery product
said label includes a transparent portion or an opening portion; and
said at least one processor is further configured to execute the instructions to determine an area in the image of the agricultural, forest and fishery product corresponding to the transparent portion or the opening portion of the label affixed to the agricultural, forest and fishery product, as the collation area.

3. The image characteristic extraction device according to claim 2, comprising a transmitter that transmits the image characteristic of the epidermal pattern in said collation area to a collation server.

4. A collation terminal device for collating an agricultural, forest and fishery product produced or shipped by a producer or distributor with the agricultural, forest and fishery product, being a collation target, comprising:
a storage in which image characteristics of epidermal patterns in a predetermined collation area of the agricultural, forest and fishery product are stored,
wherein the collation area is an area of which a location and a direction are set relative to a reference of the agricultural, forest and fishery product;
at least one memory storing instructions, and
at least one processor configured to execute the instructions to:
from an image of an epidermal pattern in the collation area of the agricultural, forest and fishery product, being a collation target, that has been imaged, determine the collation area relative to the reference in the image, extract an image characteristic of the epidermal pattern in said collation area, the image characteristic including at least one of a luminance value and characteristic points, the characteristic points including an endpoint, an intersection point, and an angle of a line of the epidermal pattern in the collation area of said agricultural, forest and fishery product, being a collation target, collate an image characteristic of the epidermal pattern stored in the storage with the image characteristic of the epidermal pattern in the collation area of said agricultural, forest and fishery product, being a collation target, determine, by comparing the at least one of the luminance value and the characteristic points of the image characteristic of the epidermal pattern in the collation area of said agricultural, forest and fishery product, being a collation target, with at least one of a luminance value and characteristic points of the image characteristic of the epidermal pattern stored in the storage, whether or not said agricultural, forest and fishery product, being a collation target, is the agricultural, forest and fishery product produced or shipped by said producer or distributor; and
display a result of the determining.

5. A distribution management method of an agricultural, forest and fishery product, using a computer, comprising:
previously storing an image characteristic of an epidermal pattern in a predetermined collation area of the agricultural, forest and fishery product to be produced or shipped by a producer or a distributor, wherein the collation area is an area of which a location and a direction are set relative to a reference of the agricultural, forest and fishery product;
imaging the epidermal pattern in said collation area of the agricultural, forest and fishery product, being a collation target, determining the collation area relative to the reference in the image and acquiring the image characteristic of the epidermal pattern in said collation area, the image characteristic including at least one of a luminance value and characteristic points, the characteristic points including an endpoint, an intersection point, and an angle of a line of the epidermal pattern in the collation area of said agricultural, forest and fishery product, being a collation target; and collating image characteristic of the epidermal pattern stored with the image characteristic of the epidermal pattern in the collation area of said agricultural, forest and fishery product, being a collation target, and determining whether or not said agricultural, forest and fishery product, being a collation target, is the agricultural, forest and fishery product produced or shipped by said producer or distributor.

6. The distribution management method of the agricultural, forest and fishery product, using the computer according to claim 5, wherein said collation area is a predetermined scope with a label to be affixed to the agricultural, forest and fishery product by the producer or distributor taken as a reference.

7. The distribution management method of the agricultural, forest and fishery product, using the computer according to claim 6, wherein identification information that enables a position of said collation area to be identified is added to said label.

8. The distribution management method of the agricultural, forest and fishery product, using the computer according to claim 6, wherein said label is transparent or opened in said collation area.

9. The distribution management method of the agricultural, forest and fishery product, using the computer according to claim 5, wherein said agricultural, forest and fishery product is at least one of a melon, a strawberry, an apple, a lemon, a pear, a mandarin, a flesh flower, fishery products, and wood.

10. A non-transitory computer readable storage medium storing a program for collating an agricultural, forest and fishery product produced or shipped by a producer or distributor with the agricultural, forest and fishery product, being a collagen target, the program causing a computer to execute:
  a receiving process of receiving an image of an epidermal pattern in a collation area of an agricultural, forest and fishery product, being a collation target, the collation area being an area of which a location and a direction are set relative to a reference of the agricultural, forest and fishery product,
  a determining process of determining the collation area relative to the reference in the received image, extracting an image characteristic of the epidermal pattern in said collation area from the received image, the image characteristic including at least one of a luminance value and characteristic points, the characteristic points including an endpoint, an intersection point, and an angle of a line of the epidermal pattern in the collation area of said agricultural, forest and fishery product, being a collation target,
  a collating process of collating said image characteristic of the epidermal pattern stored in a storage with the image characteristic of the epidermal pattern in the collation area of said agricultural, forest and fishery product, being a collation target, the storage in which image characteristics of epidermal patterns in a predetermined collation area of the agricultural, forest and fishery product are stored, and
  a determining process of determining, by comparing the at least one of the luminance value and the characteristic points of the image characteristic in the received image with at least one of a luminance value and characteristic points of the image characteristic of the epidermal pattern stored in the storage, whether or not said agricultural, forest and fishery product, being a collation target, is the agricultural, forest and fishery product produced or shipped by said producer or distributor.

11. A non-transitory computer readable storage medium storing a program for collating an agricultural, forest and fishery product produced or shipped by a producer or distributor with the agricultural, forest and fishery product, being a collation target, the program causing a computer to execute:
  a determining process of, from an image of an epidermal pattern in a collation area of the agricultural, forest and fishery product, being a collation target, that has been imaged, determining a collation area relative to a reference in the image, the collation area relative to the reference in the image is an area of which a location and a direction are set relative to a reference of the agricultural, forest and fishery product,
  an extracting process of extracting an image characteristic of the epidermal pattern in said collation area relative to the reference in the image, the image characteristic including at least one of a luminance value and characteristic points, the characteristic points including an endpoint, an intersection point, and an angle of a line of the epidermal pattern in the collation area of said agricultural, forest and fishery product, being a collation target,
  a collating process of collating an image characteristic of the epidermal pattern stored in a storage with the image characteristic of the epidermal pattern in the collation area of said agricultural, forest and fishery product, being a collation target, the storage in which image characteristics of epidermal patterns in a predetermined collation area of the agricultural, forest and fishery product are stored,
  a determining process of determining, by comparing the at least one of the luminance value and the characteristic points of the image characteristic of the epidermal pattern in the collation area of said agricultural, forest and fishery product, being a collation target, with at least one of a luminance value and characteristic points of the image characteristic of the epidermal pattern stored in the storage, whether or not said agricultural, forest and fishery product, being a collation target, is the agricultural, forest and fishery product produced or shipped by said producer or distributor, and
  a displaying process of displaying a result of the determining.

* * * * *